(12) United States Patent
Owen et al.

(10) Patent No.: US 7,669,001 B1
(45) Date of Patent: Feb. 23, 2010

(54) METHOD AND SYSTEM FOR USING APPLICATION SPECIFIC INTEGRATED CIRCUITS

(75) Inventors: Mark A. Owen, Apple Valley, MN (US); Frank R. Dropps, Maple Grove, MN (US); Leonard W. Haseman, Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 291 days.

(21) Appl. No.: 11/469,377

(22) Filed: Aug. 31, 2006

(51) Int. Cl.
*G06F 13/36* (2006.01)
(52) U.S. Cl. .......................................... 710/315; 710/14
(58) Field of Classification Search ................. 710/305, 710/313–315, 11, 14, 65, 72; 713/400
See application file for complete search history.

(56) References Cited

U.S. PATENT DOCUMENTS

| | | | | |
|---|---|---|---|---|
| 5,581,744 A | * | 12/1996 | Papanier et al. | 713/400 |
| 6,182,203 B1 | * | 1/2001 | Simar et al. | 712/22 |
| 6,622,187 B1 | * | 9/2003 | Brune et al. | 710/100 |
| 7,188,209 B2 | * | 3/2007 | Pettey et al. | 710/317 |
| 7,397,788 B2 | * | 7/2008 | Mies et al. | 370/351 |

\* cited by examiner

*Primary Examiner*—Clifford H Knoll
(74) *Attorney, Agent, or Firm*—Klein, O'Neill & Singh, LLP (57) ABSTRACT

A method and system for processing received and transmit data by an application specific integrated circuit (ASIC) from a network link. The method for received data includes swapping received data polarity if swap-polarity ability is set and swapping byte lanes for the received data if swap-lane ability is set. The method for transmit data includes swapping byte lanes for transmit data, if swap-byte lane ability is set and swapping data polarity if swap-polarity ability is set. The ASIC includes a network connector that receives and transmits data from the network link.

36 Claims, 7 Drawing Sheets

METHOD AND SYSTEM FOR USING APPLICATION SPECIFIC INTEGRATED CIRCUITS

BACKGROUND

1. Field of the Invention

The present invention relates to application specific integrated circuits (ASICs), and more particularly, to using ASICs' in different platform/operating environments.

2. Background of the Invention

ASICs are commonly used in different applications and operating environments. For example, ASICs are used in host bus adapters (HBAs) and switch chassis/elements. HBAs and switches may be used in different operating environments, for example, Fibre Channel, InfiniBand and Serial Attached SCSI based networks.

Typically, ASICs for HBAs and switches receive and transmit data via a network connector located on printed circuit boards (PCB). To operate the ASIC, a positive data signal is fed to a positive input pin of the network connector and a negative data signal is fed to a negative input pin of the connector.

The network connector can be on the top or bottom side of the PCB. If the network connector is on the top side of the PCB, data signals are routed directly to the pins of the connector with minimal loss of signal integrity.

If the network connector is on the bottom side of the PCB, the ability to maintain signal integrity has challenges. For example, a signal trace has to change routing layers so that the ASIC can function and maintain integrity in different environments. To accomplish this, extra via structures may be placed on PCB traces. Via structures may be used so that data signals from the ASIC cross over to connect to the pins of the network connector. This approach has disadvantages because it causes degraded signal integrity, reduced propagation distance and increased jitter.

Another approach is to design a separate ASIC for each environment/platform. For example, separate ASICs (switch element or HBA) may be used in a Fibre Channel network, InfiniBand and Serial Attached SCSI based networks. This solution is expensive and hence is undesirable.

Therefore, there is a need for a method and system that allows an ASIC to be used in different environments/platforms without causing significant signal integrity degradation.

SUMMARY OF THE INVENTION

In one aspect of the present invention, a method for processing received data by an application specific integrated circuit (ASIC) from a network link is provided. The method includes swapping received data polarity if swap-polarity ability is set and swapping byte lanes for the received data if swap-lane ability is set.

In another aspect of the present invention, a method for processing transmit data from an application specific integrated circuit (ASIC) via a network link is provided. The method includes swapping byte lanes for transmit data, if swap-byte lane ability is set and swapping data polarity if swap-polarity ability is set.

In yet another aspect of the present invention, an application specific integrated circuit (ASIC) for processing data received data via a network link is provided. The ASIC includes a network connector that receives data from the network link and sends the data to a receive port; wherein data polarity is swapped if swap polarity ability is enabled and byte lanes are swapped if swap-lane ability is enabled.

In yet another aspect of the present invention, an application specific integrated circuit (ASIC) for processing transmit data on a network link is provided. The ASIC includes a data transmit circuit that sends data bytes to a transmit port; wherein the transmit port swaps data bytes if swap-lane ability is set and swaps data polarity if swap-polarity ability is set; and transmits the data to the network link via a network connector.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention are now described with reference to the drawings. In the drawings, the same components have the same reference numerals. The illustrated embodiments are intended to illustrate, but not to limit the invention. The drawings include the following figures.

DETAILED DESCRIPTION

In one aspect of the present invention, a method and system are provided which re-define incoming link signals within an ASIC so that signals can be swapped. The swapping allows the ASIC to be used in different environments.

To facilitate an understanding of the invention, the general architecture and operation of a network system is described. The specific architecture and operation of the embodiments of the invention are then described with reference to the general architecture.

Figure 1A:
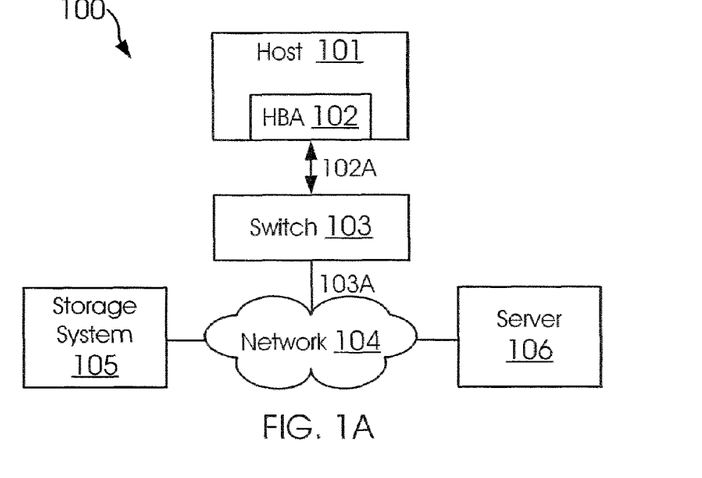
FIG. 1A shows an example of a network system used according to one aspect of the present invention.

FIG. 1A shows a block diagram of a network system 100 implementing the methods and systems according to the adaptive aspects of the present invention. Network system 100 includes plural devices that are interconnected. For example, a host computing system 101 (also referred to as "host 101") communicates with storage subsystem 105 and server 106 via HBA 102. Switch 103 allows plural entities (or nodes) to communicate with each other.

The devices of FIG. 1A are operationally coupled via "links" or "paths". For example, link 102A connects HBA 102 to switch 103, and link 103A connects switch 103 to network 104. The links may be based on Fibre Channel, InfiniBand, Serial Attached SCSI or other standard/proprietary specifications.

Fibre Channel specifications conform to a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which allows the host systems to be connected to multiple devices. The Fibre Channel fabric topology allows several media types to be interconnected.

A Fibre Channel switch is a multi-port device where each port manages a point-to-point connection between the port and an attached system. For example, each port can be attached to a server, peripheral, I/O subsystem, bridge, hub, router, or even another switch. In one embodiment, the Fibre Channel switch receives messages from one port and routes it to another port.

Fibre Channel devices (for example, HBA 102/Switch 103A) include one or more ports, classified as node ports (N_Ports), fabric ports (F_Ports), and expansion ports (E_Ports). N_ports may be located in a node device, for example, server 106 and storage system 105. F_ports are located in fabric devices such as switch 103. Arbitrated loop (not shown) may be operationally coupled to switch 103 using arbitrated loop ports (FL_Ports).

InfiniBand is another switched fabric interconnect standard for servers. The technology is deployed for server clusters/enterprise data centers ranging from two to thousands of nodes. The InfiniBand standard is published by the InfiniBand Trade Association, and is incorporated herein by reference in its entirety.

Serial Attached SCSI (SAS) is a computer bus technology primarily designed for transfer of data to and from devices like hard-disks, CD-ROM and so on. SAS is a serial communication protocol for direct attached storage devices. It is designed for the corporate and enterprise market as a replacement for parallel SCSI, allowing for much higher speed data transfers than previously available, and is backwards-compatible with the serial ATA (SATA) standard. Though SAS uses serial communication instead of the parallel communication found in traditional SCSI devices, it still uses SCSI commands for interacting with SAS End devices. SAS protocol is developed and maintained by T10 committee and is incorporated herein by reference in its entirety.

Switch 103 may include a multi-port ASIC (for example, 20-ports) in a switch chassis. The ASIC maybe implemented as a single CMOS ASIC, and for this reason the term "fabric element/switch element" and ASIC are used interchangeably to refer to the other embodiments in this specification.

Figure 1B:
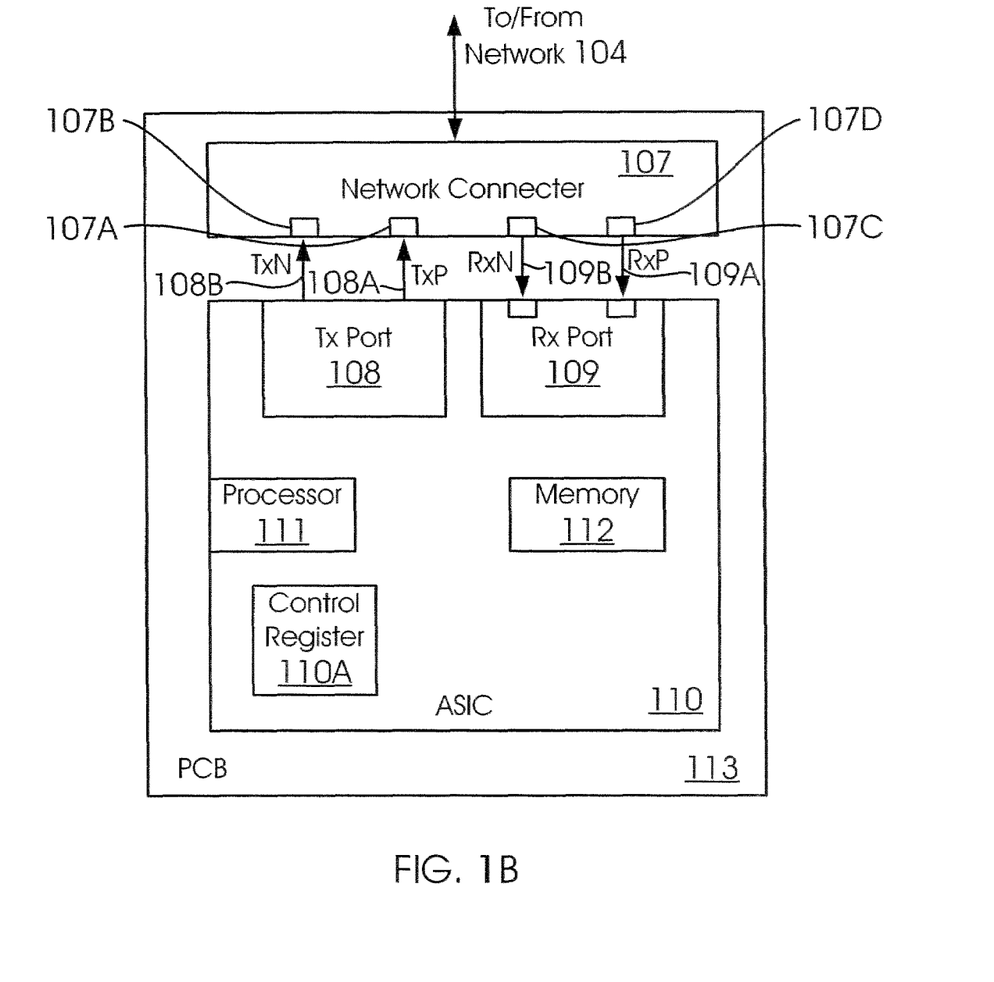
FIG. 1B shows an ASIC (switch or HBA) that uses swap-polarity/swap-byte lane ability, according to one aspect of the present invention.

FIG. 1B shows PCB 113 with ASIC 110 and network connector 107, according to one aspect of the present invention. ASIC 110 may be used in HBA 102 and/or switch 103 in different platforms/environments (for example, Fibre Channel/InfiniBand/Serial Attached SCSI).

ASIC 110 includes a transmit port 108 used to transmit information to the network and other devices and a receive port 109 used to process information that is received from other devices or another transmit port. The functionality of transmit port 108 and receive port 109 may be included in a single port.

Transmit port 108 transmits serial data via network connector 107. In one aspect, network connector 107 complies with the standard XAUI interface, which is incorporated herein by reference in its entirety.

PCB trace 108A connects positive transmit serial data (TxP) to connector pin 107A. PCB trace 108B connects negative transmit serial data (TxN) to connector pin 107B. Receive port 109 receives data from the network via network connector 107. PCB trace 109A connects positive receive serial data (RxP) to the positive pin 107C. PCB trace 109B connects negative receive serial data (RxN) to pin 107D.

ASIC 110 may include a processor 111 that access to memory 112. Processor 111 executes firmware code out of memory 112 to control the overall operation of ASIC 110.

A control register 110A is also provided to store certain bit values. The bit values are used by ASIC 110 components (transmit port/receive port) for swapping signal polarity and/or byte lanes.

Processor 111 reads polarity/lane swapping configuration information from memory 112 and loads PCB specific configuration information in control register 110A. Based on the configuration information, individual ports may be configured to operate in different environments. In one aspect, as described below, the present invention allows polarity swapping/lane swapping so that ASIC 110 can be used in different systems regardless of whether connector 107 is on top or bottom.

Figure 1C:
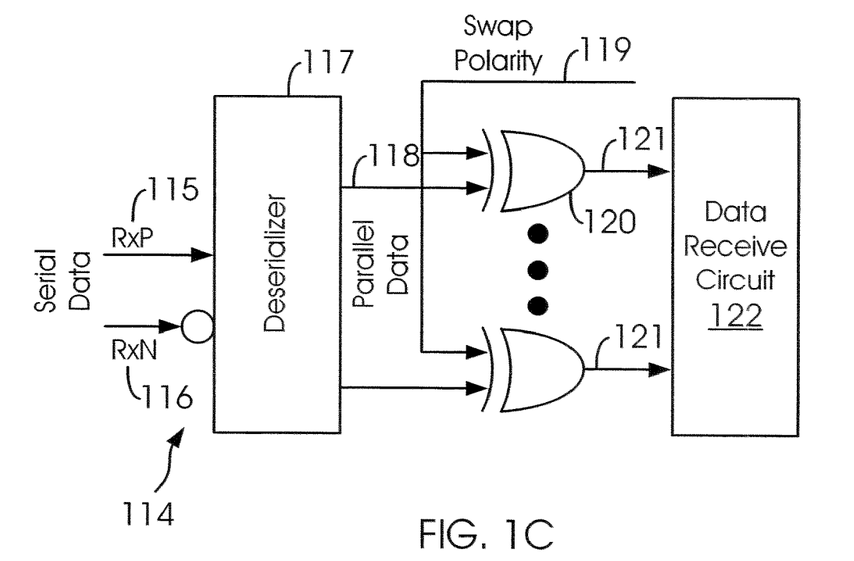
FIG. 1C shows a circuit for swapping polarity of received data on a network link, according to one aspect of the present invention.

FIG. 1C shows a circuit for swapping polarity for received data on a network link, according to one aspect of the present invention. Serial data from network connector 107 is shown as 115 (positive (RxP) and 116 (negative, RXN). De-serializer 117 converts the incoming serial data into parallel data (shown as 118). Output 118 is sent as an input to an Exclusive OR gate 120.

The Exclusive OR gate 120 also receives a swap-polarity bit signal 119. Based on signal 119, the polarity of data 118 is swapped. Signal 119 allows signal polarity to be swapped so that the same ASIC 110 may be used in different environments.

Signal 119 is generated based on a bit value set in control register 110A (FIG. 1B) or by an external input. In one aspect, processor 111 sets the "swap-polarity bit" in control register 110A.

If signal 119 is driven by control register 110A, then polarity selection may be incorporated in a link negotiation process, described below.

The output from Exclusive OR gate 120 (shown as 121) is sent to data receive circuit 122 which further processes the received data. Data receive circuit 122 may be located in receive port 109 (FIG. 1B).

Figure 1D:
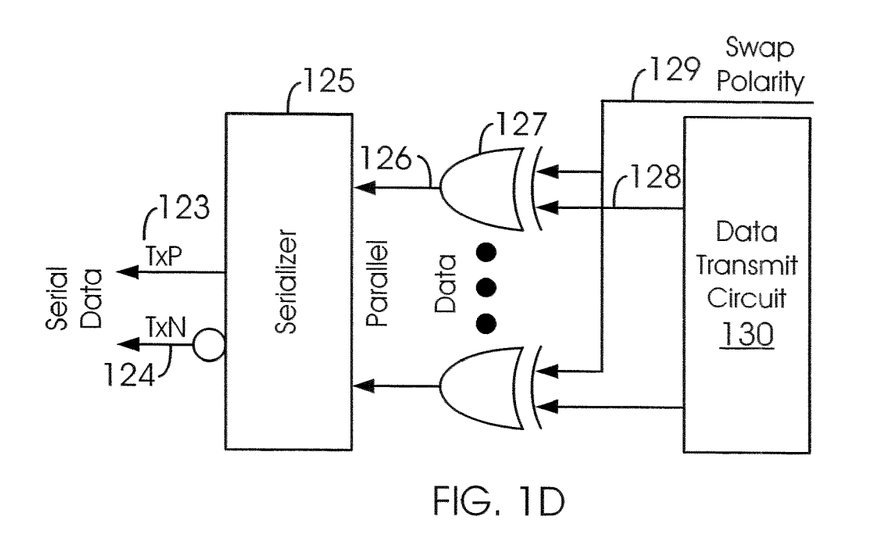
FIG. 1D shows a circuit for swapping polarity of transmitted data on a network link, according to one aspect of the present invention.

FIG. 1D shows a circuit for swapping polarity for transmitted data on a network link so that the same ASIC (for example, ASIC 110) may used in different environments, according to one aspect of the present invention.

Parallel data 128 from data transmit circuit 130 is input to Exclusive OR gate 127. The other input to Exclusive OR gate 127 is a swap-polarity bit signal 129 that can be based on a bit value set in control register 110A or received via an external pin (not shown). Based on signal 129, the polarity of parallel data 126 is swapped.

Serializer 125 serializes parallel data 126 and then serial data (shown as 123 and 124 (positive and negative, respectively) is transmitted to network 104 (FIG. 1A).

Figure 1E:
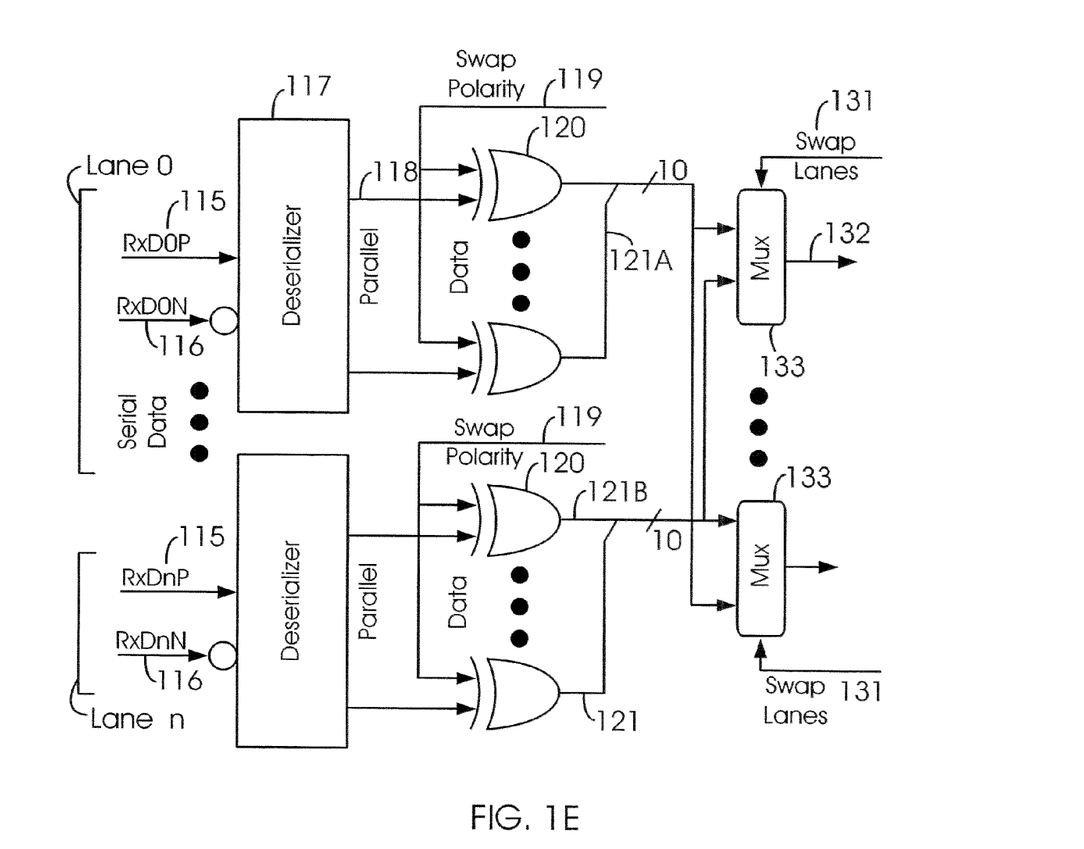
FIG. 1E shows a circuit for swapping byte lanes for a receive port, according to one aspect of the present invention.

FIG. 1E shows a circuit for swapping byte lanes/polarity for data received by ASIC 110 (FIG. 1B), according to one aspect of the present invention. ASIC 110 may have multiple ports and multiple lanes to receive and transmit data. When ASIC 110 uses multiple lanes (for example, in a Fibre Channel switch element) both signal polarity and byte lane configurations may have to be changed so that the same ASIC can be used in different environments having different signal requirements.

Various components of FIG. 1E have been described above with respect to FIG. 1C for swapping polarity. The following describes lane swapping, according to one aspect of the present invention.

FIG. 1E shows logical components for two byte lanes, 0 and n. The present invention is not limited to any particular number of byte lanes.

Output 121A, for byte lane 0, and 121B, for byte lane n, from Exclusive OR gate 120 are input to multiplexer ("Mux") 133. Mux 133 swaps byte lanes based on swap-lane signal 131. Swap lane signal 131 may be based on a bit that is set in control register 110A by processor 111, or set by an external input (not shown) to ASIC 110. Output 132 from Mux 133 is sent to a data receive circuit (122, FIG. 1C) which further process the received data.

Figure 1F:
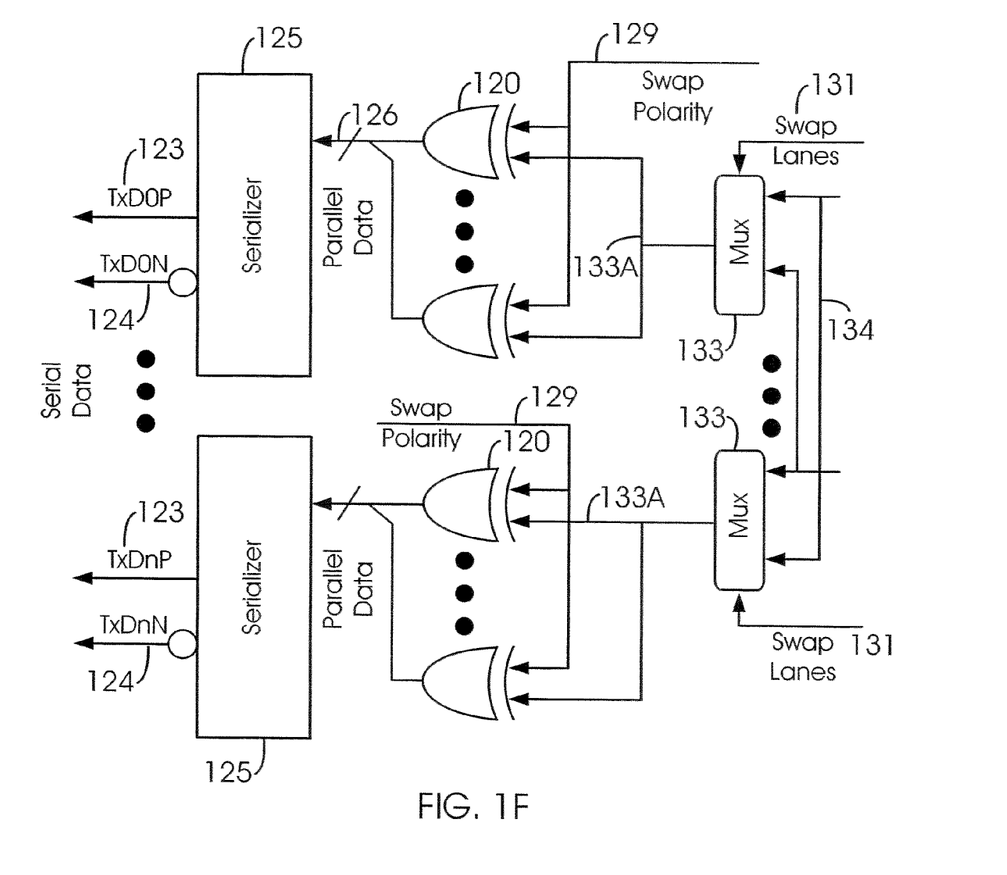
FIG. 1F shows a circuit for swapping byte lanes for a transmit port, according to one aspect of the present invention.

FIG. 1F, shows a circuit for swapping byte lanes on the transmit side, according to one aspect of the present invention. Data transmit circuit 130 transmits parallel data 134 to Mux 133 that also receives a swap-lane signal 131. Based on swap lane signal 131, Mux 133 swaps lanes for input data 134.

Output 133A from Mux 133 is then input to Exclusive OR gate 120. Exclusive OR gate 120 also receives a swap-polarity signal 129, based on signal 129, input data polarity is swapped.

Output 126 from Exclusive OR gate 120 is transmitted to serializer 125, which serializes parallel data 126 to serial data (123 and 124).

Figures 1G, 2A:
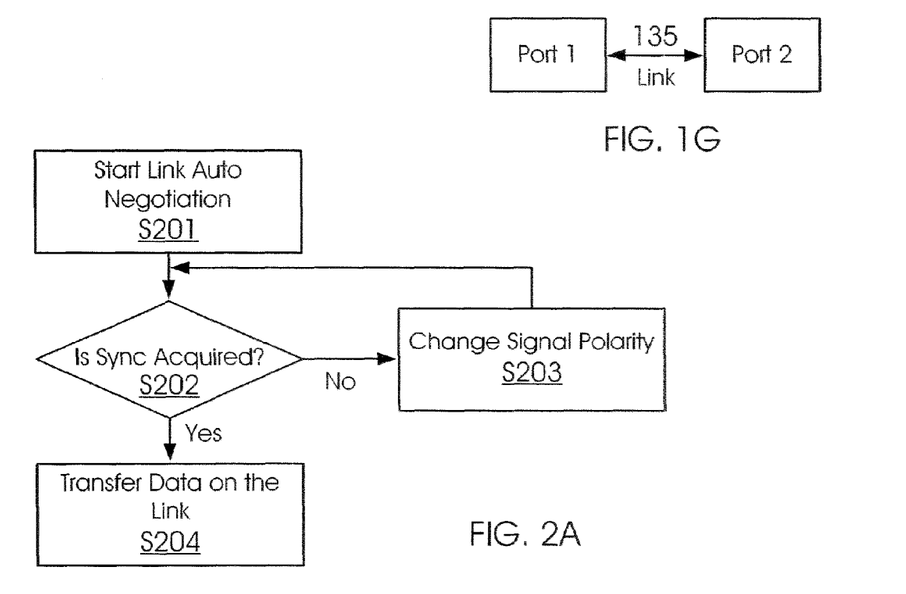
FIG. 1G shows two ports auto-negotiating, according to one aspect of the present invention.
FIG. 2A shows a flowchart for auto link negotiation, according to one aspect of the present invention.

FIG. 2A shows a flowchart for auto link negotiation between a transmit port and a receive port, according to one aspect of the present invention. Auto link negotiation is a port login process in which login parameters, such as link speed login credits, are negotiated between a transmit port and a receive port. As illustrated in FIG. 1G, Port 1 and Port 2 auto-negotiate using link 135.

Turning to FIG. 2A, the auto-negotiation process starts in step S201. In step S202, each port tries all supporting speeds until "Sync" is acquired on the link.

If Sync is not acquired, then in step S203, swap-polarity signal 119 is enabled. As discussed above, signal 119 may be enabled by setting a bit value in control register 110A or via an external pin (not shown).

If Sync is acquired in step S202, then data can be received/transmitted on the link (135).

Figure 2B:
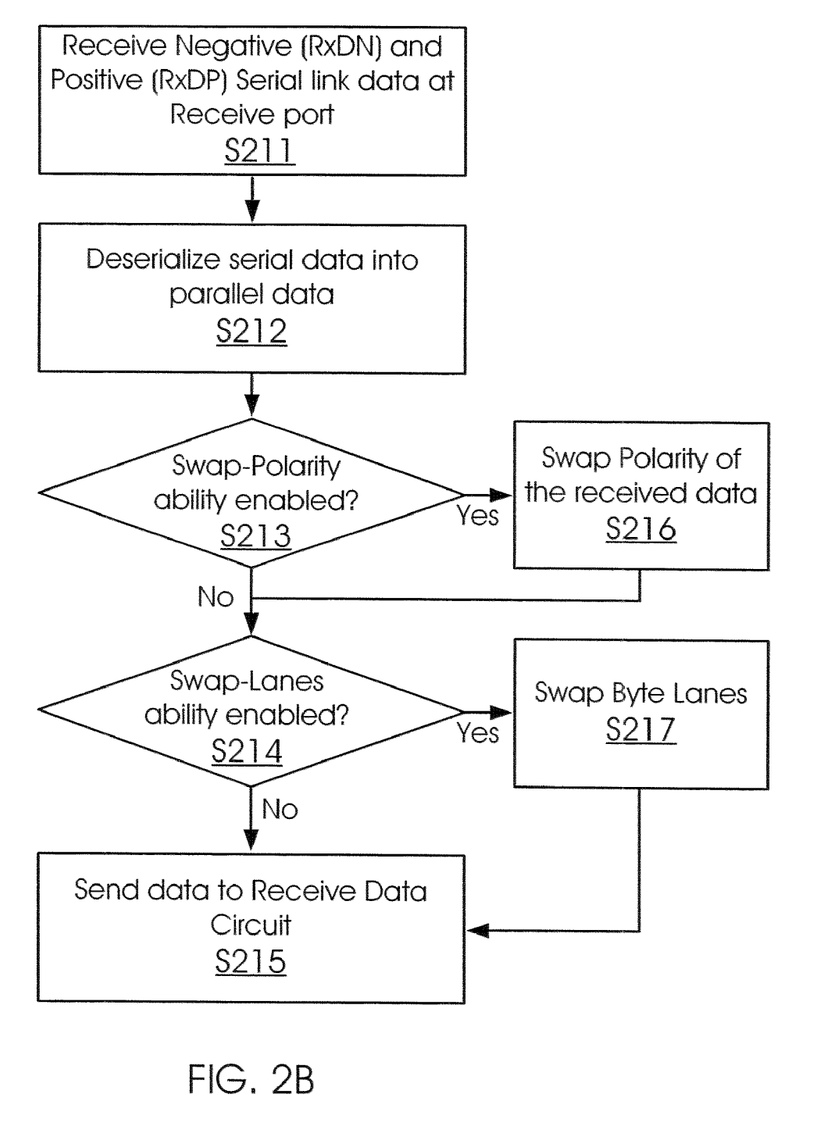
FIG. 2B shows a flowchart for processing received data, according to one aspect of the present invention.

FIG. 2B shows a flowchart for processing data at a receive port, according to one aspect of the present invention. In step S211, receive port 109 (FIG. 1B) receives positive (RxP) and negative (RxN) data.

In step S212, de-serializer 117 (FIG. 1C) converts the received serial data into parallel data.

In step S213, processor 111 (or the receive port) determines if swap polarity is enabled. As discussed above, a bit value may be set in control register 110A or via an external pin to enable/disable swap-polarity capability. A bit value of 1 may indicate that swap-polarity is enabled and a bit value of 0 may indicate that swap-polarity is disabled, or vice-versa.

If swap-polarity is enabled, then in step S216, data polarity is swapped, i.e. positive data signal is swapped with negative data signal and vice-versa.

If the swap-polarity is not enabled in step S213, then in step S214, processor 111 determines if swap-lane ability is enabled. A register bit value in control register 110A can enable or disable "swap lane" ability. For example, a bit value of 1 may indicate that swap-lane ability is set and a bit value of 0 may indicate that swap-lane is disabled, or vice-versa.

If swap-lane ability is enabled, then in step S217, byte lanes are swapped and data is sent to a data receive circuit 122 in step S215.

For illustration purposes, if at any instance byte0, byte1, byte2, byte3 are received. If the swap-lane ability is set, then byte0 is swapped with byte3, and byte1 is swapped with byte2.

In one aspect of the present invention, enabling swap-polarity reduces the need for received signal traces to cross over, thereby preserving signal integrity, Similarly, enabling the swap-lane ability reduces the need to cross over received byte signals, thereby improving signal integrity.

Figure 2C:
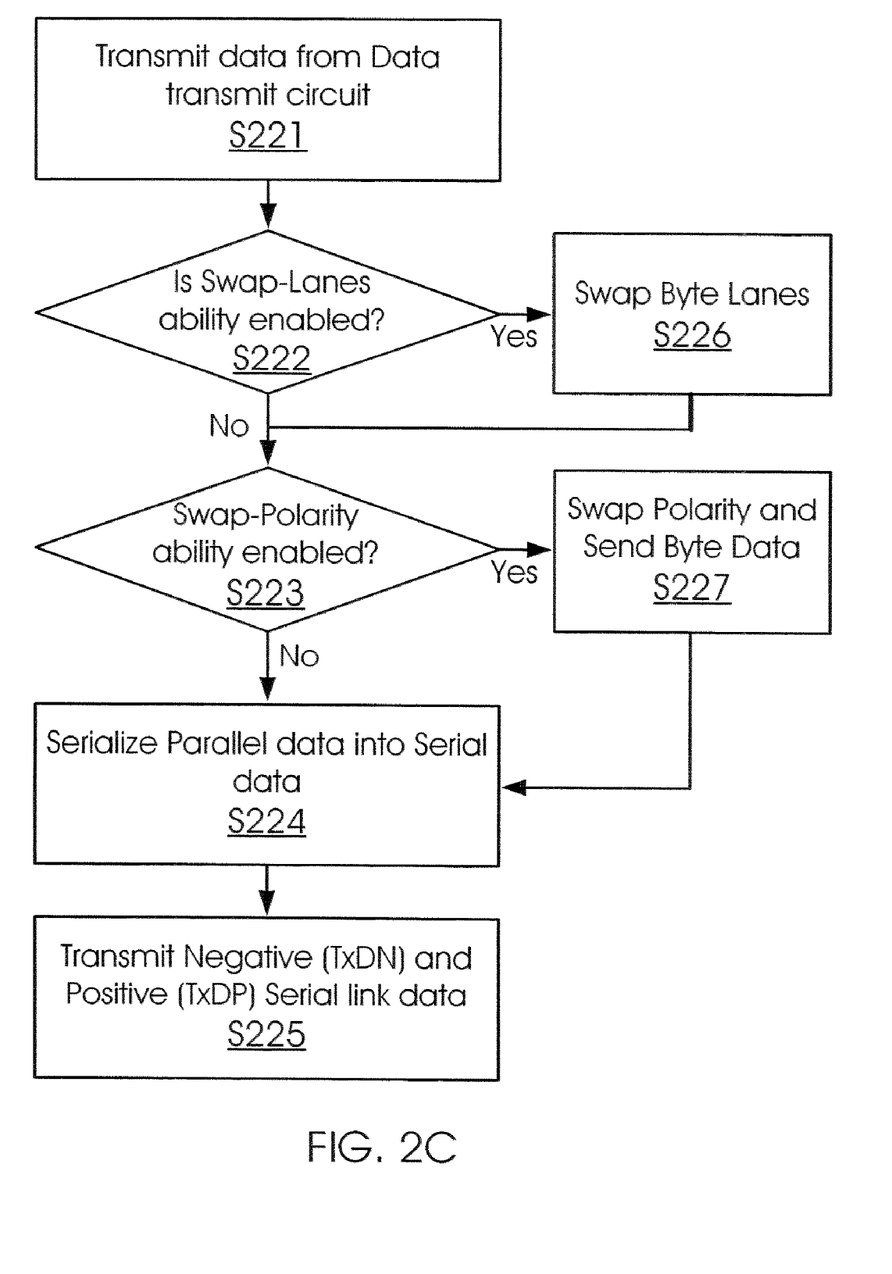
FIG. 2C shows a flowchart for processing transmitted data, according to one aspect of the present invention.

FIG. 2C shows a flowchart for processing transmitted data, according to one aspect of the present invention.

Data transmit circuit 130 (FIG. 1D) sends parallel data in step S221. In step S222, processor 111 determines if a swap-lane ability is enabled.

If swap-lane ability is enabled, then in step S226 the byte lanes are swapped. For example, if byte0, byte1, byte2, byte3 are 4 bytes that are to be transmitted. If swap-lane ability is enabled, then byte0 is swapped with byte3, and byte1 is swapped with byte2. If the swap-lane ability is not set, the bytes are not swapped and the bytes are transmitted in their respective byte lanes.

If swap-lane ability is not enabled in step S222, then in step S223 processor 111 determines if swap-polarity ability is enabled. If swap polarity ability is enabled, then data polarity is swapped, i.e. positive data signal is swapped with negative data signal and vice-versa.

Thereafter, in step S224, data is sent to serializer 125, which converts parallel data into serial data and in step S225, serial data is transmitted to its destination.

In one aspect of the present invention, the same ASIC may be used in different environments/platforms that are using different signaling mechanisms. Separate ASICs for each environment are not needed.

Although the present invention has been described with reference to specific embodiments, these embodiments are illustrative only and not limiting. Many other applications and embodiments of the present invention will be apparent in light of this disclosure and the following claims.

What is claimed is:

1. A method for processing data received by an application specific integrated circuit (ASIC) from a network link, comprising:

providing the ASIC configured to selectively receive serial data from the network link from at least two network environments;

setting a swap-polarity ability based on a selected network environment;

setting a swap-lane ability based on the selected network environment;

receiving serial data from the network link;

deserializing serial data into a parallel data;

swapping polarity of the parallel data if a swap-polarity ability is set; and swapping byte lanes for the parallel data if a swap-lane ability is set.

2. The method of claim 1, wherein a processor setting a bit value in a control register enables the swap-polarity ability.

3. The method of claim 1, wherein a processor setting a bit value in a control register enables the swap-lane ability.

4. The method of claim 1, wherein swap-polarity ability and swap-lane ability are set via external ASIC pins.

5. The method of claim 1, wherein swap-polarity ability and swap-lane ability are set via an Auto Negotiation process.

6. The method of claim 1, wherein the ASIC comprises a switch element.

7. The method of claim 1, wherein the ASIC comprises a host bus adapter.

8. The method of claim 1, wherein the network environment is selected from a Fibre Channel, Infiniband and a Serial Attached SCSI network.

9. The method of claim 1, wherein the at least two network environments use different signaling mechanisms.

10. A method for processing transmit data from at application specific integrated circuit (ASIC) via a network link, comprising:
   providing the ASIC configured to selectively transmit serial data to the network link for at least two network environments;
   setting a swap-polarity ability based on a selected network environment;
   setting a swap-lane ability based on the selected network environment;
   providing parallel transmit data;
   swapping byte lanes for the parallel transmit data if a swap-byte lane ability is set;
   swapping the parallel transmit data polarity if a swap-polarity ability is set;
   serializing the parallel transmit data; and
   transmitting the serial transmit data.

11. The method of claim 10, wherein a processor sets a bit in a control register to enable swap-polarity ability.

12. The method of claim 10, wherein a processor sets a bit in a control register to enables swap-lane ability.

13. The method of claim 10, wherein swap-polarity ability and swap-lane ability are set via external ASIC pins.

14. The method of claim 10, wherein swap-polarity ability and swap lane ability are set via an Auto Negotiation process.

15. The method of claim 10, wherein the ASIC comprises a switch element.

16. The method of claim 10, wherein the ASIC comprises a host bus adapter.

17. The method of claim 10, wherein the network environment is selected from a Fibre Channel, Infiniband and a Serial Attached SCSI network.

18. The method of claim 10, wherein the at least two network environments use different signaling mechanisms.

19. An application specific integrated circuit (ASIC) for processing data received via a network link, comprising:
   a network connector configured to receive serial data from the network link from at least two selectable network environments;
   a deserializer configured to receive the serial data from the network connector and output deserialized serial data into a parallel data;
   a circuit for swapping polarity is configured to receive the parallel data and swap the polarity of the parallel data if a swap polarity ability is enabled based on a selected network environment; and
   a circuit for swapping byte lane is configured to receive the parallel data from the circuit for swapping polarity and swaps the byte lanes for the parallel data if swap-lane ability is enabled based on the selected network environment.

20. The ASIC of claim 19, further comprising a processor for setting a bit in a register to enable the swap-polarity ability.

21. The ASIC of claim 19, further comprising a processor for setting a bit in a register to enable the swap-lane ability.

22. The ASIC of claim 19, wherein the swap-polarity ability and the swap-lane ability are set via external ASIC pins.

23. The ASIC of claim 19, wherein the swap-polarity ability and the swap lane ability are set via an Auto Negotiation process.

24. The ASIC of claim 19, wherein the ASIC comprises a switch element.

25. The ASIC of claim 19, wherein the ASIC comprises a host bus adapter.

26. The ASIC of claim 19, wherein the network environment is selected from a Fibre Channel, Infiniband and a Serial Attached SCSI network.

27. The method of claim 19, wherein the at least two network environments use different signaling mechanisms.

28. An application specific integrated circuit (ASIC) for processing transmit data on a network link, comprising:
   a data transmit circuit that sends data bytes to a transmit port;
      wherein the ASIC is configured to selectively transmit serial data to the network link for at least two network environments;
      set a swap-polarity ability based on a selected network environment; and
      set a swap-lane ability based on the selected network environment; and
   wherein the transmit port is configured to receive data bytes as a parallel data and which includes
      a circuit for swapping polarity that is configured to receive the parallel data and swap the polarity of the parallel data if a swap polarity ability is enabled based on the selected network environment;
      a circuit for swapping byte lane is configured to receive the parallel data from the circuit for swapping polarity and swaps the byte lanes for the parallel data if swap-lane ability is enabled based on the selected network environment; and
      a serializer that is configured to receive the parallel data processed by the circuit for swapping polarity and the circuit for swapping byte lanes and serializes the parallel data and transmits the serialized data to the network link via a network connector.

29. The ASIC of claim 28, further comprising a processor for setting a bit in a register to enable the swap-polarity ability.

30. The ASIC of claim 28, further comprising a processor for setting a bit in a register to enables the swap-lane ability.

31. The ASIC of claim 28, wherein swap-polarity ability and the swap-lane ability are set via external ASIC pins.

32. The ASIC of claim 28, wherein swap-polarity ability and swap lane ability is set via an Auto Negotiation process.

33. The ASIC of claim 28, wherein the ASIC comprises a switch element.

34. The ASIC of claim 28, wherein the ASIC comprises a host bus adapter.

35. The ASIC of claim 28, wherein the network environment is selected from a Fibre Channel, Infiniband and a Serial Attached SCSI network.

36. The method of claim 28, wherein the at least two network environments use different signaling mechanisms.

* * * * *

UNITED STATES PATENT AND TRADEMARK OFFICE
CERTIFICATE OF CORRECTION

PATENT NO. : 7,669,001 B1  Page 1 of 1
APPLICATION NO. : 11/469377
DATED : February 23, 2010
INVENTOR(S) : Mark A. Owen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 313 days.

In column 6, line 21, delete "integrity," and insert -- integrity. --, therefor.

In column 7, line 31, in claim 10, delete "data" and insert -- data, --, therefor.

In column 8, line 56, in claim 32, delete "is" and insert -- are --, therefor.

Signed and Sealed this

Fifth Day of October, 2010

David J. Kappos
*Director of the United States Patent and Trademark Office*